United States Patent
Parris et al.

(10) Patent No.: US 8,625,944 B1
(45) Date of Patent: *Jan. 7, 2014

(54) LOW-SHRINK REDUCED-DIAMETER BUFFER TUBES

(75) Inventors: Don Parris, Newton, NC (US); Patrick King Strong, Connelly Springs, NC (US); Denise Matthews, Newton, NC (US); Jeffrey Scott Barker, Statesville, NC (US)

(73) Assignee: Draka Comteq, B.V., Amsterdam (NL)

( * ) Notice: Subject to any disclaimer, the term of this patent is extended or adjusted under 35 U.S.C. 154(b) by 561 days.

This patent is subject to a terminal disclaimer.

(21) Appl. No.: 12/779,407

(22) Filed: May 13, 2010

Related U.S. Application Data

(60) Provisional application No. 61/177,843, filed on May 13, 2009.

(51) Int. Cl.
  *G02B 6/44* (2006.01)
  *G02B 6/38* (2006.01)

(52) U.S. Cl.
  USPC .......................................... 385/109; 385/60

(58) Field of Classification Search
  USPC .................................... 85/109, 60
  See application file for complete search history.

(56) References Cited

U.S. PATENT DOCUMENTS

| | | |
|---|---|---|
| 4,446,686 A | 5/1984 | Panuska et al. |
| 4,574,574 A | 3/1986 | Knaak |
| 4,640,576 A | 2/1987 | Eastwood et al. |
| 4,772,435 A | 9/1988 | Schlaeppi et al. |
| 4,814,116 A | 3/1989 | Oestreich et al. |
| 4,838,643 A | 6/1989 | Hodges et al. |
| 4,859,223 A | 8/1989 | Kajioka et al. |
| 4,893,998 A | 1/1990 | Schlaeppi et al. |
| 4,921,413 A | 5/1990 | Blew |
| 4,983,333 A | 1/1991 | Blew |
| 5,372,757 A | 12/1994 | Schneider |
| 5,574,816 A | 11/1996 | Yang et al. |
| 5,627,932 A | 5/1997 | Kiel et al. |
| 5,717,805 A | 2/1998 | Stulpin |
| 5,761,362 A | 6/1998 | Yang et al. |
| 5,852,698 A | 12/1998 | Bringuier |
| 5,903,693 A | 5/1999 | Brown |
| 5,911,023 A | 6/1999 | Risch et al. |
| 5,938,987 A | 8/1999 | Paivinen |
| 5,982,968 A | 11/1999 | Stulpin |
| 6,035,087 A | 3/2000 | Bonicel et al. |
| 6,054,070 A | 4/2000 | Tokairin et al. |

(Continued)

FOREIGN PATENT DOCUMENTS

| | | |
|---|---|---|
| EP | 1361465 A1 | 11/2003 |
| EP | 1369724 A2 | 12/2003 |

(Continued)

OTHER PUBLICATIONS

U.S. Appl. No. 61/096,750, filed Sep. 12, 2008, pp. 1-55.

(Continued)

*Primary Examiner* — Kaveh Kianni
(74) *Attorney, Agent, or Firm* — Addition, Higgins, Pendleton & Ashe, P.A.

(57) ABSTRACT

Disclosed is a low-shrink buffer tube having a reduced diameter. The buffer tube provides adequate crush resistance and is suitable for deployments requiring mid-span access.

26 Claims, 2 Drawing Sheets

(56) References Cited

U.S. PATENT DOCUMENTS

| | | | |
|---|---|---|---|
| 6,066,275 A | 5/2000 | Robinson et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,278,831 B1 | 8/2001 | Henderson et al. | |
| 6,292,611 B1 * | 9/2001 | Chamberlain et al. | 385/114 |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,389,204 B1 | 5/2002 | Hurley | |
| 6,389,214 B1 | 5/2002 | Smith et al. | |
| 6,493,491 B1 | 12/2002 | Shen et al. | |
| 6,546,175 B1 * | 4/2003 | Wagman et al. | 385/113 |
| 6,569,247 B1 | 5/2003 | Aura et al. | |
| 6,579,014 B2 | 6/2003 | Melton et al. | |
| 6,594,427 B1 | 7/2003 | Dixon et al. | |
| 6,603,908 B2 | 8/2003 | Dallas et al. | |
| 6,618,538 B2 | 9/2003 | Nechitailo et al. | |
| 6,633,709 B2 * | 10/2003 | VanVickle et al. | 385/112 |
| 6,634,075 B1 | 10/2003 | Lento | |
| 6,648,520 B2 | 11/2003 | McDonald et al. | |
| 6,658,184 B2 | 12/2003 | Bourget et al. | |
| 6,749,446 B2 | 6/2004 | Nechitailo | |
| 6,771,861 B2 | 8/2004 | Wagner et al. | |
| 6,785,450 B2 * | 8/2004 | Wagman et al. | 385/100 |
| 6,801,696 B2 | 10/2004 | Davis et al. | |
| 6,813,422 B1 | 11/2004 | Krishnamurthy et al. | |
| 6,827,884 B2 * | 12/2004 | Marelli et al. | 264/1.28 |
| 6,834,553 B2 | 12/2004 | Ravichandran et al. | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 7,035,510 B2 | 4/2006 | Zimmel et al. | |
| 7,035,706 B2 | 4/2006 | Franz | |
| 7,045,010 B2 | 5/2006 | Sturman, Jr. | |
| 7,092,781 B2 | 8/2006 | Franz et al. | |
| 7,162,128 B2 | 1/2007 | Lovie et al. | |
| 7,200,307 B2 | 4/2007 | Bau et al. | |
| 7,270,485 B1 | 9/2007 | Robinson et al. | |
| 7,272,282 B1 | 9/2007 | Seddon et al. | |
| 7,280,725 B2 | 10/2007 | Brown et al. | |
| 7,321,709 B2 * | 1/2008 | Yokokawa et al. | 385/103 |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,373,055 B1 | 5/2008 | Strong | |
| 7,373,057 B2 | 5/2008 | Pizzorno et al. | |
| 7,391,944 B2 | 6/2008 | Storaasli et al. | |
| 7,445,811 B2 | 11/2008 | Elomaki et al. | |
| 7,483,613 B2 | 1/2009 | Bigot-Astruc et al. | |
| 7,515,795 B2 | 4/2009 | Overton et al. | |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,574,095 B2 | 8/2009 | Lock et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,817,891 B2 | 10/2010 | Lavenne et al. | |
| 7,970,247 B2 * | 6/2011 | Barker | 385/100 |
| 7,974,507 B2 | 7/2011 | Lovie et al. | |
| 2002/0001443 A1 | 1/2002 | Bringuier | |
| 2002/0096793 A1 * | 7/2002 | Marelli et al. | 264/1.28 |
| 2002/0168155 A1 | 11/2002 | Rossi et al. | |
| 2003/0026919 A1 | 2/2003 | Kojima et al. | |
| 2003/0099446 A1 | 5/2003 | Witt et al. | |
| 2005/0031276 A1 | 2/2005 | Zimmel et al. | |
| 2005/0147363 A1 * | 7/2005 | Chastain et al. | 385/100 |
| 2005/0213900 A1 * | 9/2005 | Rhyne et al. | 385/100 |
| 2005/0228062 A1 | 10/2005 | Wolf et al. | |
| 2005/0234145 A1 | 10/2005 | Sitzmann et al. | |
| 2005/0241820 A1 | 11/2005 | Wasserman et al. | |
| 2005/0276551 A1 | 12/2005 | Brown et al. | |
| 2007/0047884 A1 | 3/2007 | Storaasli et al. | |
| 2007/0104429 A1 * | 5/2007 | Yokokawa et al. | 385/112 |
| 2007/0127878 A1 | 6/2007 | de Montmorillon et al. | |
| 2007/0214841 A1 | 9/2007 | Pedrido | |
| 2007/0274647 A1 | 11/2007 | Pizzorno et al. | |
| 2008/0056651 A1 | 3/2008 | Nothofer et al. | |
| 2008/0138026 A1 | 6/2008 | Yow et al. | |
| 2008/0193090 A1 | 8/2008 | Riddett et al. | |
| 2008/0292262 A1 | 11/2008 | Overton et al. | |
| 2008/0317410 A1 | 12/2008 | Griffioen et al. | |
| 2009/0003785 A1 | 1/2009 | Parris et al. | |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 * | 3/2010 | Barker | 385/109 |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0202741 A1 | 8/2010 | Ryan et al. | |
| 2010/0214649 A1 | 8/2010 | Burov et al. | |
| 2010/0215328 A1 | 8/2010 | Tatat et al. | |
| 2010/0247093 A1 * | 9/2010 | Nakanishi et al. | 398/9 |
| 2010/0254653 A1 | 10/2010 | Molin et al. | |

FOREIGN PATENT DOCUMENTS

| | | | |
|---|---|---|---|
| EP | 1420279 A2 | 5/2004 | |
| EP | 1515171 A1 | 3/2005 | |
| EP | 1921478 A1 | 5/2008 | |
| EP | 2163928 A2 | 3/2010 | |
| WO | 2007/013923 A1 | 2/2007 | |
| WO | 2009/062131 A1 | 5/2009 | |

OTHER PUBLICATIONS

U.S. Appl. No. 61/113,146, filed Nov. 10, 2008, pp. 1-53.
U.S. Appl. No. 60/986,737, filed Nov. 9, 2007, pp. 1-60.
U.S. Appl. No. 61/041,484, filed Apr. 1, 2008, pp. 1-73.
U.S. Appl. No. 61/112,595, filed Nov. 7, 2008, pp. 1-315.
U.S. Appl. No. 61/101,337, filed Sep. 30, 2008, pp. 1-59.
U.S. Appl. No. 61/112,006, filed Nov. 6, 2008, pp. 1-63.
U.S. Appl. No. 61/112,374, filed Nov. 7, 2008, pp. 1-74.
U.S. Appl. No. 60/969,401, filed Aug. 31, 2007, pp. 1-54.
U.S. Appl. No. 61/139,228, filed Dec. 19, 2008, pp. 1-50.
European Search Report in commonly owned European Application No. 09011651 dated Aug. 11, 2010 (counterpart of related U.S. Appl. No. 12/557,055).
Corning, "Installing a Furcation Kit on a Composite Drop Cable," SRP-006-110, Issue 4, Nov. 2003, pp. 1-4, Corning Cable Systems LLC, Hickory, NC.

(56) References Cited

OTHER PUBLICATIONS

Draka, Product specification for "ezDrop Flat Cable—Connectorized," Issue Date: May 21, 2009, Claremont, NC, pp. 1-2.

Corning, product specification for "OptiTap Connector," EVO-592-EN, Corning Cable Systems LLC, Hickory, NC, Sep. 2005, pp. 1-2.

Lahti, "Enhanced Buffering Process for Totally Dry Cable", International Wire & Cable Symposium, (IWCS), Nov. 2006, Rhode Island, USA, pp. 323-326.

Hurley et al., "Shrinkback-Induced Attenuation in Loose Tube Cables", International Wire & Cable Symposium, (IWCS), Nov. 2007, Lake Buena Vista, FL, USA, pp. 414-418.

U.S. Appl. No. 12/098,804 for a "Transmission Optical Fiber Having Large Effective Area," Sillard et al., filed May 6, 2009.

U.S. Appl. No. 61/148,745, filed Jan. 30, 2009, pp. 1-34.

Montgomery, et al., "Optimizing the UV-Curable Tight Buffering Fiber Process," DSM Desotech, Inc., Elgin, IL, http://www.dsm.com/en_US/downloads/dsmd/WireAsia.pdf, downloaded on Dec. 3, 2008, pp. 1-5.

Rechberger "High speed Buffering and Lay Plate SZ-Stranding of Fibre Optical Cables," Rosendahl Maschinen GmbH, Austria, pp. 1-7, Jun. 4, 2002, pp. 1-7.

Rosendahl, "FOC-Dry Tube Production RL-R/OFC40 Clenching Concept Clenching Caterpillar NCA 210," http://www.rosendahlaustria.com/custom/rosendahlaustria/Rosendahl_Products_PDF/productinfo_dry_tube_clenching_caterpillar_nca_210.pdf, downloaded on Nov. 13, 2008, pp. 1-2.

Rosendahl Product Sheet, "Dry Tube production—a clenching concept," http://rosendahl.hgs.at/default_rosendahl.aspx?Ing=&menueid=388&contentid=971&back=1, downloaded on Dec. 23, 2008, pp. 1-2.

Applicant's IDS Transmittal Letter in commonly owned U.S. Appl. No. 12/558,390 dated May 26, 2011, pp. 1-2.

Draka, Product specification for "Enhanced Single-Mode Optical Fiber (ESMF)," Netherlands, Issue Date May 2009, pp. 1-2.

Draka, Product specification for "BendBrightTM Single Mode Optical Fiber," Netherlands, Issue Date Aug. 2010, pp. 1-2.

Draka, Product specification for "BendBrightXS TM Single-Mode Optical Fiber," Netherlands, Issue Date Nov. 2007, pp. 1-11.

Draka, Product specification for "DrakaEliteTM BendBright-Elite Fiber," Netherlands, Issue Date May 2009, pp. 1-2.

U.S. Appl. No. 12/696,338 for a "Process for Making Loose Buffer Tubes Having Controlled Excess Fiber Length and Reduced Post-Extrusion Shrinkage," Strong et al., filed Jan. 29, 2010, pp. 1-36.

U.S. Appl. No. 61/148,745 for a "Improved Process for Making Loose Buffer Tubes Having Controlled Excess Fiber Length and Reduced Post-Extrusion Shrinkage," Strong et al., filed Jan. 30, 2009, pp. 1-29.

IDS Transmittal Letter in the present application dated Oct. 31, 2011, pp. 1-2.

Matthews, "Loose Tube FTTX Buffer Tube Mid-span Access—Test Method Comparison", International Wire & Cable Symposium, (2009) Proceedings of the 58th IWCS/IICIT, pp. 105-108.

Henry et al., "Low Shrinkage in Wire and Cable Extrusion and the Importance of Grade Selection", International Wire & Cable Symposium, (2007) Proceedings of the 56th IWCS, pp. 610-613.

U.S. Appl. No. 12/779,419 for a "Low-Shrink Reduced-Diameter Dry Buffer Tubes," Parris et al., filed May 13, 2010, pp. 1-57.

\* cited by examiner

LOW-SHRINK REDUCED-DIAMETER BUFFER TUBES

CROSS-REFERENCE TO PRIORITY APPLICATION

This application claims the benefit of commonly assigned U.S. Patent Application No. 61/177,843, for Low-Shrink Reduced-Diameter Buffer Tubes (filed May 13, 2009), which is hereby incorporated by reference in its entirety.

FIELD OF THE INVENTION

The present invention relates to low-shrink, gel-filled buffer tubes having reduced diameter.

BACKGROUND

As compared with traditional wire-based networks, optical fiber communication networks are capable of transmitting significantly more information at significantly higher speeds. Optical fibers, therefore, are being increasingly employed in communication networks.

To expand total transmission throughput, optical fiber network providers are attempting to place ever more optical fibers in ever-smaller spaces. Packing fibers into tight spaces, however, can cause undesirable attenuation. Indeed, there is an inherent trade-off between increased fiber density and signal attenuation. Accordingly, a need exists for increasing the fiber density within loose buffer tubes (i.e., the buffer-tube filling coefficient) without causing undesirable attenuation.

Another issue that has been encountered is that reduced-size cables are often desirable for certain installations (e.g., where space is limited). In this regard, reduced-size cable designs are requiring ever-smaller buffer tubes. As buffer tubes become increasingly small, however, excess fiber length (EFL) becomes a significant problem. As will be known by those having ordinary skill in the art, EFL can occur as a result of buffer tube shrinkage during processing and thereafter as post-extrusion shrinkage (PES), which can lead to undesirable attenuation. In this regard, it is believed that smaller buffer tubes shrink more than larger buffer tubes under the same conditions.

U.S. Pat. No. 7,373,057 (Pizzorno) proposes to achieve highly reduced cable diameters by employing bend-resistant optical fibers having, at a wavelength of 1550 nanometers, microbending sensitivity of less than 4.0 (dB/km)/(gf/mm) when measured by an expandable drum apparatus at a temperature between about −30° C. and 60° C. In effect, U.S. Pat. No. 7,373,057, which is hereby incorporated by reference in its entirety, achieves higher filling coefficients and fiber densities by simply employing microbend-insensitive optical fibers. U.S. Pat. No. 7,373,057 does not address the problem of post-extrusion shrinkage (e.g., during mid-span deployment), and thus its high-density design is inappropriate for standard single-mode fibers (SSMF) in which mid-span accessibility is required (i.e., SSMF at elevated buffer-tube filling coefficients).

Buffer-tube designs having somewhat higher optical fiber densities have been achieved for the deployment of standard single-mode-fibers. For example, as many as 12 discrete, conventional optical fibers (e.g., SSMFs having a diameter of about 245-255 microns) have been deployed in loose buffer tubes with an outer diameter larger than 2.5 millimeters and an inner diameter larger than 1.6 millimeters. For SSMFs, however, as the buffer-tube filling coefficient approaches 0.3, attenuation becomes problematic, particularly at extreme temperatures (e.g., −40° C. or 70° C.). This is especially so with respect to mid-span storage performance, such as deployments in which SSMFs are positioned in pedestals, cabinets, or other optical-fiber enclosures. By way of example, loose-tube cables must be accessible multiple times along its installed length at various positions, typically at such optical-fiber enclosures.

By way of illustration, after installation in a microduct, an optical-fiber cable typically experiences temperature cycles. These temperature cycles can lead to signal attenuation. Indeed, significant changes in temperature can lead to post-extrusion shrinkage and increases in excess fiber length (EFL), which may contribute to signal attenuation. Thus, a loose buffer tube that is less susceptible to post-extrusion shrinkage is more suitable for mid-span storage. It is generally thought that cables containing buffer tubes having a lower buffer-tube filling coefficient are less susceptible to attenuation when subjected to temperature cycles and thus are more suitable for mid-span storage.

Reducing the wall thickness of a buffer tube while maintaining its outer diameter necessarily increases its inner diameter and thus the cross-sectional area available for deploying optical fibers. For many optical fiber applications, reducing buffer-tube wall thickness is unsatisfactory because such buffer tubes provide insufficient crush resistance (i.e., hoop strength). For many rigorous applications, buffer tubes must be capable of handling loads during installation and use in a way that conforms to customer expectations.

Despite efforts to achieve reduced-diameter buffer tubes, a need exists for buffer-tube designs that provide satisfactory mid-span storage and crush resistance for both standard single-mode fibers and bend-insensitive optical fibers.

SUMMARY

Accordingly, the present invention embraces an optical-fiber loose buffer tube that includes discrete optical fibers positioned within a polymeric tube. A thixotropic composition at least partially fills the polymeric tube to provide water-blocking and coupling functionality. The loose buffer tube has a reduced-diameter, typically possessing a buffer-tube filling coefficient of about 0.30 or higher.

The optical fibers typically comply with the ITU-T G.652.D recommendation, but need not comply with either the ITU-T G.657.A1 (11/2009) recommendations or the ITU-T G.657.B2 (11/2009) recommendations. In other words, the present optical-fiber buffer tube can successfully employ conventional single-mode fibers (SSMF) at elevated buffer-tube filling coefficients without having to resort to microbend-resistant optical fibers.

The present loose buffer tube can withstand substantial loads, typically demonstrating permanent deformations of less than about 10 percent after sheave testing as herein described.

Despite its increased filling coefficient, the present loose buffer tube maintains acceptable mid-span performance. Combined with its increased fiber density, the present optical-fiber buffer tube is especially useful in numerous kinds of optical-fiber deployments (e.g., FTTx), such as fiber-to-the-home (FTTH).

In one exemplary embodiment, upon subjecting the present optical-fiber loose buffer tube to the mid-span testing according to the GR-20-CORE mid-span standard, the optical fibers possess an average change in optical-fiber attenuation of no more than 0.15 dB at 1550 nanometers.

In another exemplary embodiment, upon subjecting the optical-fiber loose buffer tube to the mid-span testing according to the USDA Rural Electrification Administration midspan standard, (i) each of the plurality of optical fibers enclosed within the buffer tube has increased attenuation of no more than about 0.1 dB and (ii) the plurality of optical fibers enclosed within the buffer tube has a mean increased attenuation of no more than about 0.05 dB.

In yet another exemplary embodiment, upon subjecting the optical-fiber loose buffer tube to the mid-span testing according to the modified USDA Rural Electrification Administration mid-span standard, the optical fibers possess an average change in optical-fiber attenuation of no more than about 0.15 dB at 1550 nanometers.

The foregoing illustrative summary, as well as other exemplary objectives and/or advantages of the invention, and the manner in which the same are accomplished, are further explained within the following detailed description and its accompanying drawing.

DETAILED DESCRIPTION

Figure 1:
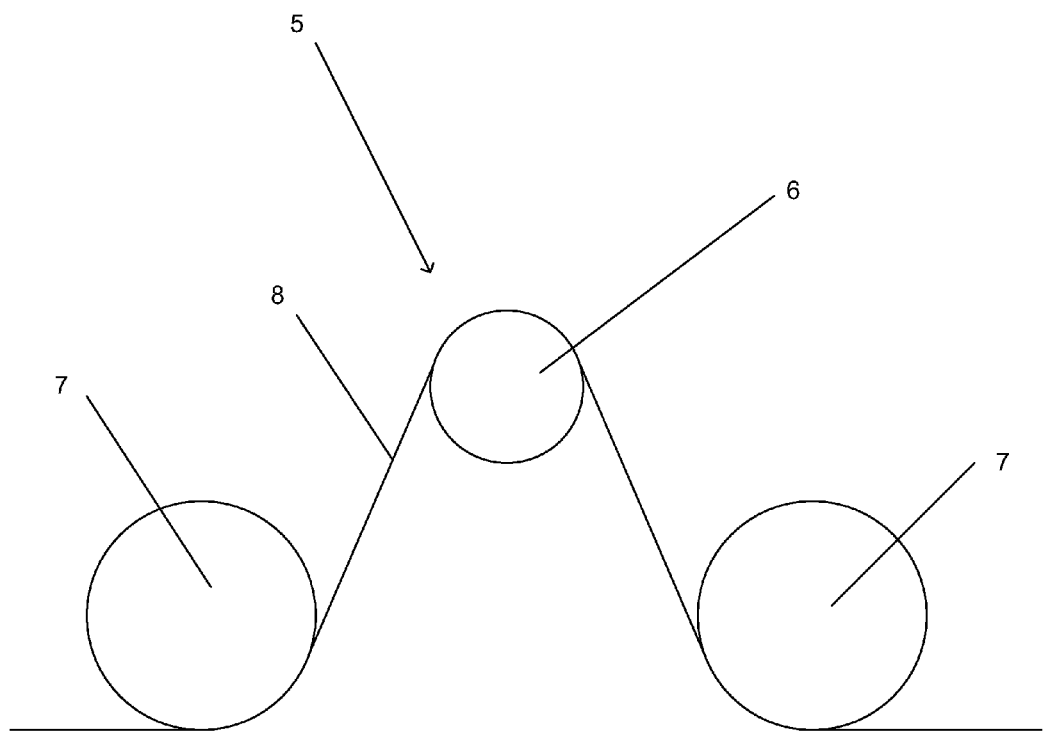
FIG. 1 schematically depicts a sheave machine employed during sheave testing.

In one aspect, the present invention embraces a reduced-diameter, loose buffer tube having an increased filling coefficient.

Moreover, the loose buffer tubes according to the present invention have reduced post-extrusion shrinkage (PES) and reduced excess fiber length (EFL). As such, optical fibers contained within the present reduced-diameter polymeric tubes are less susceptible to attenuation. This reduced risk of undesirable attenuation is particularly important for optical fibers lacking improved bend resistance (e.g., standard single-mode fibers (SSMFs)). Consequently, the present loose buffer tubes may employ SSMFs at higher filling coefficients while still being suitable for use in mid-span deployments.

As used herein, the term "buffer-tube filling coefficient" refers to the ratio of the total cross-sectional area of the fibers within a buffer tube versus the inner cross-sectional area of that buffer tube (i.e., defined by the inner boundary of the buffer tube). Optical-fiber cables that include the present buffer tubes have a relatively high buffer-tube filling coefficient.

Alternatively, to the extent that non-circular buffer tubes are used, the longest inner cross-sectional width of the buffer tube can be used to define the diameter of a theoretical circularized buffer tube cross-sectional area. As used herein, the term "circularized buffer-tube filling coefficient" refers to the ratio of the total cross-sectional area of the optical fibers enclosed within buffer tubes versus the sum of the theoretical circularized cross-sectional areas of the buffer tubes containing those optical fibers.

A circularized buffer-tube filling coefficient is one convenient way to characterize the cross-sectional area of an irregularly shaped buffer tube. Those having ordinary skill in the art will appreciate that for all but circular buffer tubes, buffer-tube filling coefficient and circularized buffer-tube filling coefficient are unequal.

In view of the foregoing, optical-fiber buffer tubes according to the present invention have a filling coefficient (or circularized filling coefficient for buffer tubes having a non-circular cross section) of at least about 0.30. For example, the buffer tubes may have a filling coefficient of at least about 0.35. By way of further example, the buffer tubes may have a filling coefficient of at least about 0.40 (e.g., about 0.45 or more or about 0.49 or more).

Buffer tubes according to the present invention are formed from a polymeric material (e.g., a polyolefin). In one embodiment, the buffer tubes may be formed from nucleated polypropylene. Buffer tubes formed from nucleated polypropylene are described, for example, in U.S. Pat. Nos. 5,574,816, 5,761,362, and 5,911,023, each of which is hereby incorporated by reference in its entirety. Those of ordinary skill in the art will appreciate that the use of nucleating agents helps to increase the Young's modulus for polypropylene. In this regard, nucleated polypropylene may have a Young's modulus of about 1,800 MPa.

Loose buffer tubes according to the present invention include a plurality of optical fibers (e.g., 12 or more optical fibers). These optical fibers may be positioned within a central annular space defined by the buffer tube (e.g., a polymeric tube). In one embodiment, the optical fibers employed in the buffer tubes according to the present invention are conventional standard single mode fibers possessing diameters (i.e., the combined diameter of the glass fiber and its coatings) of between about 235 microns and 265 microns (e.g., 242 microns). That said, it is within the scope of the invention to employ optical fibers having smaller diameters (e.g., about 200 microns).

In this regard, those having ordinary skill in the art will recognize that an optical fiber with a primary coating (and an optional secondary coating and/or ink layer) typically has an outer diameter of between about 235 microns and about 265 microns ($\mu$m). The component glass fiber itself (i.e., the glass core and surrounding cladding layers) typically has a diameter of about 125 microns, such that the total coating thickness is typically between about 55 microns and 70 microns.

By way of example, the component glass fiber may have an outer diameter of about 125 microns. With respect to the optical fiber's surrounding coating layers, the primary coating may have an outer diameter of between about 175 microns and about 195 microns (i.e., a primary coating thickness of between about 25 microns and 35 microns) and the secondary coating may have an outer diameter of between about 235 microns and about 265 microns (i.e., a secondary coating thickness of between about 20 microns and 45 microns). Optionally, the optical fiber may include an outermost ink layer, which is typically between two and ten microns.

As will be appreciated by those having ordinary skill in the art, a reduced-diameter optical fiber is cost-effective, requiring less raw material. Moreover, a reduced-diameter optical fiber (e.g., an outermost diameter between about 150 microns and 230 microns) requires less deployment space (e.g., within a buffer tube and/or fiber optic cable), thereby facilitating increased fiber count and/or reduced cable size.

With respect to optical fibers having a reduced diameter, the thickness of the primary coating and/or secondary coating is reduced, while the diameter of the component glass fiber is typically maintained at about 125 microns. For example, the primary coating layer may have an outer diameter of between about 135 microns and about 175 microns (e.g., about 160 microns), and the secondary coating layer may have an outer diameter of between about 150 microns and about 230 microns (e.g., more than about 165 microns, such as about 190-210 microns). In other words, the total diameter of the optical fiber is reduced to less than about 230 microns (e.g., about 200 microns).

Suitable single-mode optical fibers (SSMF) that are compliant with the ITU-T G.652.D requirements are commercially available, for instance, from Draka (Claremont, N.C.) (e.g., under the trade name BendBrighe). Those of ordinary skill in the art will appreciate that standard optical fibers are typically sensitive to bending (e.g., microbending or macrobending), which can lead to attenuation. Thus, to enable higher filling coefficients without causing unsatisfactory attenuation, the buffer tubes according to the present invention have reduced post-extrusion shrinkage (PES) and reduced excess fiber length (EFL).

In one embodiment, the reduced-diameter loose buffer tubes of the present invention employ conventional optical fibers that, at a wavelength of 1550 nanometers, have microbending sensitivity of more than 3.5 (dB/km)/(gf/mm), such as 4.0 (dB/km)/(gf/mm) or more, when measured by an expandable drum apparatus at a temperature between about −30° C. and 60° C. in accordance with U.S. Pat. No. 7,373,057 (Pizzorno). As noted, U.S. Pat. No. 7,373,057 is incorporated by reference in its entirety.

In another embodiment, the reduced-diameter loose buffer tubes of the present invention employ conventional optical fibers that, at 23° C. and a wavelength of 1550 nanometers, have microbending sensitivity (added loss) of more than 0.5 dB/km, typically more than 1.0 dB/km (e.g., 1.5 dB/km or more), when measured by a modified IEC fixed-diameter sandpaper drum test (i.e., IEC TR62221, Method B). This particular modified IEC fixed-diameter sandpaper drum test winds, at a controlled back tension of 150 gf, a 440-meter optical fiber sample onto a 300-mm diameter quartz cylinder that is wrapped with adhesive-backed, 320-grit sandpaper. Various modified and unmodified IEC TR62221 tests are disclosed in commonly assigned U.S. patent application Ser. No. 12/267,732 (Overton), now published as U.S. Patent Application Publication No. 2009/0175583 A1.

In yet another embodiment, bend-insensitive fibers may be employed in the loose buffer tubes according to the present invention. Bend-insensitive optical fibers perform better (i.e., are less susceptible to attenuation) than standard optical fibers in the mid-span temperature-cycle test at high buffer-tube filling coefficients. Accordingly, bend-insensitive optical fibers facilitate a reduction in buffer-tube inner diameter and/ or an increase in EFL tolerance.

Therefore, it is within the scope of the present invention to employ bend-insensitive glass fiber that meets the ITU-T G.657.A standards (e.g., the ITU-T G.657.A1 (11/2009) and the ITU-T G.657.A2 (11/2009) subcategories) and/or the ITU-T G.657.B standards (e.g., the ITU-T G.657.B2 (11/ 2009) and the ITU-T G.657.B3 (11/2009) subcategories). In this regard, the ITU-T G.657.A1 (11/2009) subcategory fully encompasses the former ITU-T G.657.A (12/2006) category, and the ITU-T G.657.B2 (11/2009) subcategory fully encompasses the former ITU-T G.657.B (12/2006) category.

By way of example, exemplary bend-insensitive single-mode glass fibers for use in the present invention are commercially available from Draka (Claremont, N.C.) under the trade name BendBright$^{XS}$® or the trade name BendBright-Elite™, which are compliant with the ITU-T G.652.D and ITU-T G.657.A1/A2/B2 (11/2009) recommendations. In this regard, this application incorporates by reference product specifications for the following Draka Comteq single-mode optical fibers: (i) Enhanced Single Mode Fiber (ESMF); (ii) BendBright® single-mode optical fiber; (iii) BendBright$^{XS}$® single-mode optical fiber; and (iv) BendBright-Elite™ single-mode optical fiber. This technical information is provided as Appendices 1-4, respectively, in commonly assigned U.S. Provisional Application No. 61/248,319 for a Reduced-Diameter Optical Fiber (filed Oct. 2, 2009), which is incorporated by reference in its entirety.

In addition, BendBright-Elite™ optical fibers are compliant with the ITU-T G.657.B3 (11/2009) recommendations. BendBright$^{XS}$® and BendBright-Elite™ optical fibers demonstrate significant improvement with respect to both macrobending and microbending. The respective ITU T G.652 and ITU-T G.657 (11/2009) recommendations are hereby incorporated by reference in their entirety.

As set forth in commonly assigned U.S. Patent Application No. 60/986,737 for a Microbend-Resistant Optical Fiber (Overton), commonly assigned U.S. Patent Application No. 61/041,484 (Overton) for a Microbend-Resistant Optical Fiber, and commonly assigned U.S. Patent Application No. 61/112,595 (Overton) for a Microbend-Resistant Optical Fiber, pairing a bend-insensitive glass fiber (e.g., Draka's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× as compared with a single-mode fiber employing a conventional coating system). It is further within the scope of the present invention to employ the coatings disclosed in U.S. Patent Application No. 60/986,737, U.S. Patent Application No. 61/041,484, and U.S. Patent Application No. 61/112,595 with the single-mode optical fiber of the present invention.

Accordingly, this application incorporates entirely by reference the following commonly assigned patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application No. PCT/US08/82927 Microbend-Resistant Optical Fiber, filed Nov. 9, 2008, (Overton et al.), now published as International Application Publication No. WO 2009/ 062131 A1; and U.S. patent application Ser. No. 12/267,732 for a Microbend-Resistant Optical Fiber, filed Nov. 10, 2008, (Overton), now published as U.S. Patent Application Publication No. 2009/0175583 A1.

Moreover, the present buffer tubes may contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

In one embodiment, exemplary buffer tubes (e.g., loose buffer tubes) according to present invention have circular cross-sections and have an outer diameter of less than about 2.5 millimeters (e.g., an outer diameter of no more than about 2.4 millimeters), typically less than about 2.35 millimeters (e.g., less than about 2.2 millimeters, such as 2.1 millimeters or less). Such exemplary buffer tubes may also have an inner diameter of less than about 1.6 millimeters (e.g., no more than about 1.4 millimeters). By way of further example, exemplary buffer tubes may have an inner diameter of about 1.3 millimeters or less (e.g., about 1.2 millimeters or less). In this regard, exemplary buffer tubes having a substantially circular cross section may have a filling coefficient of between about 0.35 and 0.50. Moreover, exemplary buffer tubes having a non-circular cross section may possess a circularized filling coefficient of between about 0.30 and 0.45.

Table 1 (below) presents exemplary buffer tubes according to the present invention. As depicted, these exemplary buffer tubes contain 12 optical fibers having an outer diameter of about 242 microns and have a filling coefficient of at least about 0.36 (i.e., an optical fiber density of about 36 percent).

TABLE 1

(Buffer-Tube Filling Coefficient)

|  | Ex. 1 | Ex. 2 | Ex. 3 |
|---|---|---|---|
| Buffer Tube OD (mm) | 2.3 | 2.2 | 2.1 |
| Buffer Tubes ID (mm) | 1.4 | 1.3 | 1.2 |
| No. Optical Fibers | 12 | 12 | 12 |
| Optical Fiber OD (μm) | 242 | 242 | 242 |
| Buffer-Tube Filling Coefficient | 0.36 | 0.42 | 0.49 |

The optical-fiber buffer tubes according to the present invention typically possess satisfactory hoop strength, meeting or exceeding conventional crush testing requirements.

Buffer-tube crush resistance may be tested with a sheave test. The purpose of a sheave test is to simulate a rigorous loading that may occur during normal cable installation. A sheave testing standard and procedure for ADSS cables ("all-dielectric self-supporting cables") may be found in the IEEE P1222 standard.

As used herein and unless otherwise specified, reference to the "sheave test" refers the testing procedures outlined as follows and depicted in FIG. 1:

The sheave test employs a sheave machine 5 having two outboard sheaves 7 (e.g., outboard sheaves having a diameter of about 850 millimeters) and a central sheave 6 having a diameter of no more than about 30× the outer diameter of the cable 8 to be tested.

Initially, a 30-meter test section (i.e., the traversed section) of a cable is installed on the sheave machine. A small load is applied to the cable to remove any slack. The height of the central sheave is adjusted relative to the outboard sheaves so that the angle of the cable from the horizontal is 35° on each side of the central sheave. A 600-lb load is applied to the cable as the cable transverses the central sheave. This step is repeated six times for each test sample.

After testing, the cable jacket (i.e., cable sheath) is removed and the buffer tubes within the cable are observed for damage and permanent deformations. Buffer tubes with permanent deformations of 10 percent or less have sufficient crush resistance (i.e., hoop strength). Buffer tube permanent deformations of 5 percent or less are barely noticeable. In this regard, after being subjected to the aforementioned sheave test, the present loose buffer tubes typically have permanent deformations of less than 10 percent (i.e., with respect to changes in buffer tube diameter). More typically, these deformations are less than about 8 percent (e.g., 5 percent or less).

Moreover, optical-fiber cables containing the present loose buffer tubes typically meet or exceed the Telcordia Technologies generic requirements for compressive strength (6.5.5) as set forth in GR-20-CORE (Issue 2, July 1998; Issue 3, May 2008). This GR-20-CORE requirement with respect to compressive strength (6.5.5) is hereby incorporated by reference in its entirety.

The optical-fiber buffer tubes according to the present invention meet or exceed conventional mid-span testing requirements.

Fiber optic cables suitable for mid-span storage are typically subjected to a mid-span temperature-cycle test, which assures certain minimum performance specifications for fiber optic cables. As noted, one such test can be found in Bulletin 1753F-601 (PE-90) from the United States Department of Agriculture Rural Electrification Administration, hereinafter referred to as the "USDA Rural Electrification Administration mid-span standard," which is hereby incorporated by reference in its entirety. An excerpt of this standard is provided as Appendix I in priority U.S. Patent Application No. 61/177,843, which, as noted, is incorporated by reference.

According to the USDA Rural Electrification Administration mid-span standard, buried and underground loose-tube single-mode cables intended for mid-span applications with tube storage should meet the following mid-span test without exhibiting an increase in fiber attenuation greater than 0.1 dB and a maximum average increase over all fibers of 0.05 dB.

Initially, the test section of the optical-fiber cable is installed in a commercially available pedestal or enclosure or in a device that mimics their performance, as follows: A length of the protective outer jacket, equal to the mid-span length (e.g. 20 feet), is removed from the middle of the test specimen to allow access to the buffer tubes. All binders, tapes, strength members, etc. are removed. The buffer tubes are left intact. The cable ends defining the ends of the mid-span length are properly secured in the enclosure (i.e., as they would be secured within an enclosure in regular commercial use). The strength members are secured with an end-stop type clamp and the protective outer jacket is clamped to prevent slippage. A minimum of 6.096 meters (20 feet) of cable extends from the entry and exit ports of the enclosure (i.e., 20 feet of the cable remain outside of the enclosure), so that optical measurements may be taken. Typically, the buffer tubes are wound in a coil with a minimum width of three (3) inches and minimum length of 12 inches. The exposed buffer tubes are loosely constrained during the test.

The enclosure, with installed cable, is placed in an environmental chamber for temperature cycling. It is acceptable for some or all of the two 20-foot (6.096 meters) cable segments (i.e., the cable segments that remain outside of the enclosure) to extend outside the environmental chamber.

Lids, pedestal enclosures, or closure covers should be removed if possible to allow for temperature equilibrium of the buffer tubes.

The attenuation of the optical fibers is measured at 1550 nanometers±10 nanometers. The supplier of the optical-fiber cable must certify that the performance of lower specified wavelengths complies with the mid-span performance requirements.

After measuring the attenuation of the optical fibers, the cable is tested per the FOTP-3 temperature-cycling standard. Temperature cycling, measurements, and data reporting must conform to the FOTP-3 standard. The test is conducted for at least five complete cycles. The following detailed test conditions are applied (i.e., using the environmental chamber) to the enclosure containing the optical-fiber cable: (A) loose-tube single-mode optical cable sample shall be tested; (B) an 8-inch to 12-inch diameter optical buried distribution pedestal or a device that mimics their performance shall be tested; (C) mid-span opening for installation of loose-tube single-mode optical cable in pedestal shall be 6.096 meters (20 feet); (D) three hours soak time (i.e., exposure time); (E) Test Condition C-2, minimum −40° C. (−40° F.) and maximum 70° C. (158° F.); (F) a statistically representative amount of transmitting fibers in all expressed buffer tubes passing through the pedestal and stored shall be measured; and (G) the buffer tubes in the enclosure or pedestal shall not be handled or moved during temperature cycling or attenuation measurements.

Fiber cable attenuation measured through the exposed buffer tubes during the last cycle at −40° C. (−40° F.) and +70° C. (158° F.) should not exceed a maximum increase of 0.1 dB and should not exceed a 0.05 dB average across all tested fibers from the initial baseline measurements. At the conclusion of the temperature cycling, the maximum attenuation increase at 23° C. from the initial baseline measurement should not exceed 0.05 dB in order to allow for measurement noise that may be encountered during the test. The cable should also be inspected at room temperature at the conclusion of all measurements. The cable should not show visible evidence of fracture of the buffer tubes nor show any degradation of the exposed cable assemblies.

Additionally, buffer-tube embodiments according to the present invention may be tested under harsher conditions than required by the USDA Rural Electrification Administration mid-span standard. For example, test samples are soaked at 70° C. for 14 hours, which is longer exposure than the three hours required by the testing conditions set forth in the aforementioned USDA bulletin. In addition, only one temperature cycle is performed during this modified USDA Rural Electrification Administration mid-span test.

In this regard, it has been observed that attenuation for the initial temperature cycle tends to be higher than for subsequent temperature cycles. This counterintuitive observation means that testing over one cycle yields higher tested attenuation levels than testing over multiple temperature cycles (e.g., five or more as set forth in the USDA Rural Electrification Administration mid-span standard).

This modified mid-span standard is hereinafter referred to as the "modified USDA Rural Electrification Administration mid-span standard." A longer soak time (i.e., exposure time) may alter the deformation of the buffer tubes because of post-extrusion shrinkage differences at this temperature (i.e., the buffer tubes may shrink in length because of the amorphous orientation generated during the extrusion process and/or crystallization).

Under these harsher conditions, the optical fibers enclosed within the buffer tube exhibit an average change in fiber attenuation of 0.15 dB or less at 1550 nanometers. Typically, the maximum change in fiber attenuation is 0.15 dB or less at 1550 nanometers.

More typically, each of the optical fibers enclosed within the buffer tube has increased attenuation of no more than about 0.1 dB, and the optical fibers enclosed within the buffer tube have a mean increased attenuation of no more than about 0.05 dB.

The attenuation limits of the modified USDA Rural Electrification Administration mid-span standard are higher at 1625 nanometers, but typically less than double (2×) the 1550-nanometer attenuation ceilings.

Buffer-tube embodiments of the present invention also passed a mid-span temperature-cycle test with conditions similar to FOTP-3 with the exception that the soak time at −40° C. was reduced from three hours to one hour. This change of conditions probably did not affect the results of the test because the change in dimensions of the buffer tubes at low temperatures should be exclusively due to the coefficient of expansion (i.e., reversible thermal contraction and expansion).

Another mid-span standard is defined by Telcordia Technologies generic requirements for optical-fiber cables as set forth in GR-20-CORE (Issue 2, July 1998; Issue 3, May 2008; Mid-Span Buffer Tube Performance of Stranded Cable—6.5.11), hereinafter referred to as the "GR-20-CORE mid-span standard." This GR-20-CORE mid-span standard, which is hereby incorporated by reference, is less rigorous than the foregoing mid-span temperature-cycle test standard defined by the United States Department of Agriculture (USDA) Rural Electrification Administration. Accordingly, the optical-fiber cables that meet the aforementioned Rural Electrification Administration's mid-span temperature-cycle test should also meet or exceed the GR-20-CORE mid-span standard.

To satisfy the GR-20-CORE generic requirements with mid-span buffer tube performance, loose-tube single-mode cables should exhibit an average change in fiber attenuation of no more than 0.15 dB at 1550 nanometers after mid-span testing. According to the generic requirements for optical-fiber cables as set forth in GR-20-CORE (Mid-Span Buffer Tube Performance of Stranded Cable—6.5.11), "[s]tranded loose-tube cables designed to have loose tubes stored in a pedestal or closure shall be capable of having a minimum of 14 feet of expressed buffer tube stored in a pedestal or closure in normal outside plant conditions without experiencing any unacceptable loss in the optical fibers stored in the expressed tubes."

The buffer tubes according to the present invention have reduced post-extrusion shrinkage (PES).

Post-extrusion shrinkage determinations can be made using either of two exemplary methods, namely the conventional oven method and the thermo-mechanical analyzer method, hereinafter referred to as the "TMA method."

In the conventional oven method, jacket and tube specimens are cut to lengths of 150 millimeters. Initial length ($L_i$) is measured by a micrometer and recorded. Specimens are placed on a bed of talc in aluminum pans and aged in an oven at 85° C. for four hours. After the four-hour aging period specimens are allowed to cool for one hour. The final length ($L_f$) is measured and recorded. Percent shrinkage is calculated as follows: $[(L_i-L_f)/L_i] \times 100$.

In the TMA method, a small 2-3 millimeter specimen is cut from the jacket or tube and sandwiched between quartz plates before being placed on the TMA sample stage. Initial length in z-axis is measured and recorded by the TMA instrument. Length measurements are recorded at ten data points per second while the specimen is subjected to the following temperature program: (i) equilibrate at 25° C. for 10 minutes; (ii) ramp to −40° C. at 10° C. per minute; (iii) ramp to 85° C. at a rate of 10° C. per minute; and (iv) ramp to −40° C. at a rate of 10° C. per minute. TMA data-analysis software may be used to calculate the shrinkage.

By way of illustration, conventional buffer tubes formed from polypropylene experience post-extrusion shrinkage of about 0.5 percent or more. Moreover, these buffer tubes are subject to additional PES of between about 0.5 and 1.5 percent or more after exposure to high temperatures (e.g., 85° C. for one hour).

In contrast, the buffer tubes according to the present invention experience post-extrusion shrinkage of less than about 0.1 percent after exposure to high temperatures (e.g., as measured with the disclosed TMA method).

Similarly, the present buffer tubes provide improved properties with respect to excess fiber length (EFL). In this regard, the present buffer tubes have EFL of less than about 0.25 percent, typically less than about 0.15 percent (e.g., 0.05 percent or less). EFL may be determined by sectioning a ten-meter sample of the buffer tube that has equilibrated for at least 24 hours after manufacture and thereupon comparing the length of constituent optical fibers against the sectioned ten-meter sample.

As noted, the buffer tubes according to the present invention are less susceptible to post-extrusion shrinkage and thus have reduced excess fiber length. Exemplary patents that teach buffering processes that control the relative lengths of optical fibers and their surrounding tubes include U.S. Pat. No. 4,893,998 (Schlaeppi et al.), which is assigned to Maillefer S. A.; U.S. Pat. No. 5,372,757 (Schneider), which is assigned to Tensor Machinery, Ltd.; U.S. Pat. No. 6,634,075 (Lento), which is assigned to Nextrom Holding S. A; and U.S. Pat. No. 7,373,055 (Strong), which is commonly assigned to Draka. Each of these U.S. patents is hereby incorporated by reference in its entirety.

Buffer tubes according to the present invention may be manufactured in accordance with the method described in commonly assigned U.S. patent application Ser. Nos. 61/148,745 and 12/696,338, each of which is hereby incorporated by reference in its entirety. This method controls buffer-tube shrinkage during steady-state buffering and tension-controlled ramping, thereby controlling excess fiber length (EFL).

Steady State Buffering

Figure 2:
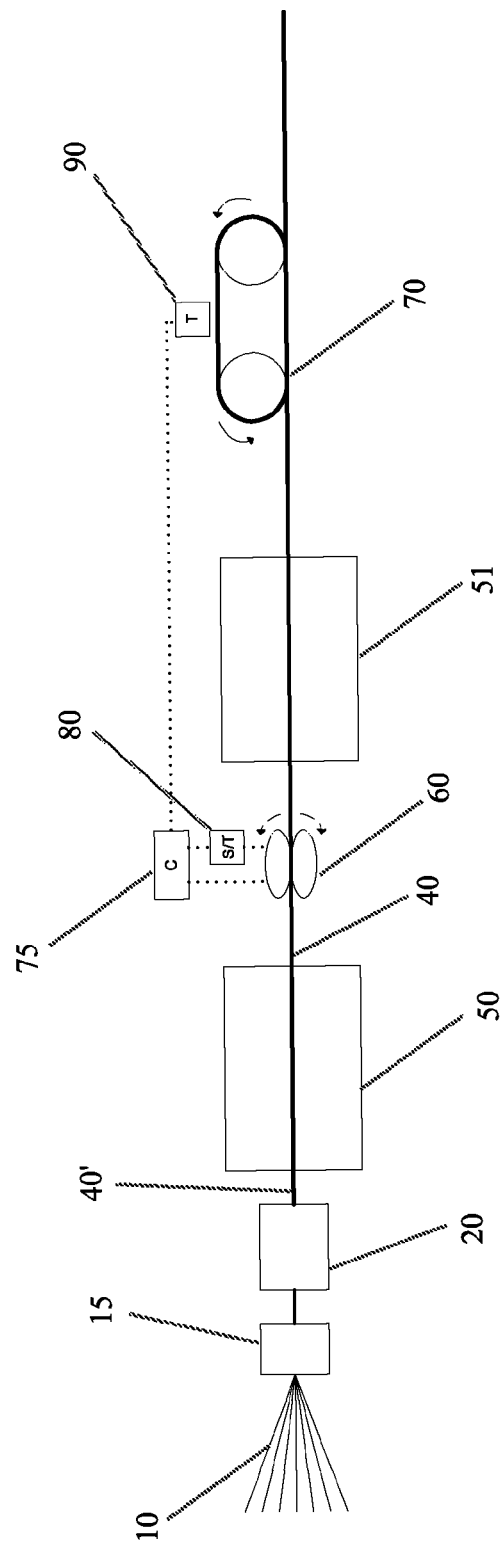
FIG. 2 schematically depicts a buffering operation that employs a buffering-assist capstan.

FIG. 2 schematically depicts a buffering operation that employs a buffering-assist capstan to form a buffer tube structure. Although FIG. 2 illustrates distinct optical fibers 10, it is thought that the buffering process is suitable for optical-fiber ribbons or other optical elements (e.g., optical fiber bundles).

Optical fibers 10 are coated with a grease-like gel at a gel applicator 15, then pulled through an extruder crosshead 20, which forms a molten polymeric sheath 40' around the optical fibers 10 (i.e., the polymeric sheath 40' surrounds both the grease-like gel and the optical fibers 10). Sufficient grease like gel is initially applied to the optical fibers 10 so as to substantially fill the polymeric sheath 40'. Alternatively, the extruder crosshead 20 may concurrently form the molten polymeric sheath 40' while filling the annular space between the optical fibers 10 and the molten polymeric sheath 40' with the grease-like gel.

The polymeric sheath 40' may be formed, for example, from a polyolefin (e.g., nucleated polyethylene, nucleated polypropylene, or a copolymer or a blend thereof), polyester (e.g., polybutylene terephthalate), or a polyamide.

After its extrusion, the molten polymeric sheath 40' is submerged in a water-filled cooling vat 50 that quickly solidifies the polymeric sheath 40', thereby forming a buffer tube 40. As will be known to those having ordinary skill in the art, the buffer tube 40 shrinks as it cools.

As schematically depicted in FIG. 2, a buffering-assist capstan 60 (i.e., the "clincher") is provided between two water-filled cooling vats 50 and 51, whereby the buffering-assist capstan 60 is maintained in somewhat dry conditions. Alternatively, the buffering-assist capstan 60 may be positioned within either water-filled cooling vat 50 or water-filled cooling vat 51.

Also as schematically depicted in FIG. 2, the buffer-assist capstan 60 typically includes upper and lower rotating rubber traction belts that grip and drive the buffer tube 40. An exemplary buffering-assist capstan for use in the present buffering process is commercially available from Maillefer S. A.

The buffer tube 40 emerges from the water-filled cooling vat 51, whereupon it is repeatedly turned (e.g., four to ten rotations) through a wet capstan 70, thereby promoting coupling of the buffer tube 40 and the enclosed optical fibers 10. It is the wet capstan 70 that effectively defines the operational line speed.

During steady-state operations (i.e., at constant line speeds), the buffering-assist capstan 60 typically runs faster than does the wet capstan 70. This speed difference is selected to accommodate buffer-tube shrinkage that occurs between the buffering-assist capstan 60 and the wet capstan 70. By way of illustration, whereas the wet capstan 70 might run at 1.00× meters per minute (mpm), the buffering-assist capstan 60 might run between about 1.01× to 1.02× meters per minute (mpm).

In effect, the buffering-assist capstan 60 imparts a downstream force (i.e., a force in the direction of processing) upon the buffer tube 40. This promotes elongation of the buffer tube 40 between the extruder crosshead 20 and the buffering-assist capstan 60. By way of example, it has been observed that a tension of between about 10-20 N is imparted to a 2.7-millimeter buffer tube 40 during typical processing conditions.

The aforementioned downstream force applied by the buffering-assist capstan 60 may subject the buffer tube 40 to a compressive force (e.g., negative tension) between the buffering-assist capstan 60 and the wet capstan 70. The downstream compressive force, if present, is sometimes indicated by the bowing of the buffer tube 40 between the buffering-assist capstan 60 and the wet capstan 70. Without being bound to any theory, it is thought that (i) the absence of an elongating tension (e.g., positive tension) between the buffering-assist capstan 60 and the wet capstan 70 encourages shrinkage of the buffer tube 40 before the optical fibers 10 become fully coupled to the buffer tube 40 and (ii) this shrinkage in the absence of positive tension reduces excessive molecular orientation of the polymers that form the buffer tube 40. Furthermore, and without being bound to any theory, it is thought that imparting high molecular orientation into the polymers that form the buffer tube 40 might lead to undesirable post-extrusion-shrinkage (PES).

The promotion of buffer-tube shrinkage before coupling has been observed to virtually eliminate post-extrusion shrinkage (PES) in buffer tubes. Indeed, the present buffering process achieves buffer tubes having EFL of less than 0.1 percent (e.g., between 0 and 0.10 percent) not only during steady state operation but also during ramping (e.g., startup). It is thought that such low levels of EFL are needed to maintain excellent optical performance in the newer cable designs that employ small-diameter buffer tubes.

Tension-Controlled Ramping

The buffering process yields buffer tubes having improved PES not only during steady-state operation but also during ramp-up (e.g., startup) and/or ramp-down (e.g., shutdown). In this regard, ramping refers to any change in buffering speed. Indeed, although ramping typically occurs during the startup and/or shutdown of buffering operations, ramping may occur at other times during buffering operations (e.g., during process disruptions).

To achieve tension-controlled ramping, the buffering process measures and controls buffer-tube tension at the buffering-assist capstan 60 relative to the increasing (or decreasing) speed of the wet capstan 70. In effect, the present buffering process includes a feedback loop.

Typically, buffer-tube tension is directly maintained as a function of wet-capstan speed. For example, at any wet-capstan ramping speed (e.g., between the initial startup speed and a steady-state speed) a sensor/transmitter 80 measures the buffer-tube tension at or near the buffering-assist capstan 60 and transmits the measurement to a controller 75. Typically, the buffer-tube tension—typically negative tension (i.e., compression)—is measured at or downstream from the buffering-assist capstan 60 (e.g., between the buffering-assist capstan 60 and the wet capstan 70). That said, it is within the scope of the present invention to measure buffer-tube tension upstream from the buffering-assist capstan 60 (e.g., between the extruder crosshead 20 and the buffering-assist capstan 60). The controller 75 compares this actual tension to the programmed set-point tension, which is predetermined for any given wet-capstan ramping speed. (In this regard, a transmitter 90, which may include speed-sensing capabilities, transmits the speed of the wet capstan 70 to the controller 75.) Typically, the measurement of actual tension and the comparison of actual tension with the programmed set-point tension occurs continuously, particularly during ramping. That said, the measurement and comparison steps may occur intermittently.

If the measured tension sufficiently deviates from the set-point tension, the controller 75 transmits a signal to the buffering-assist capstan 60 to adjust its speed. Alternatively, the ramping method can employ any suitable mechanism for adjusting buffer-tube tension. For example, the apparatus could employ a supplemental tension device for making fine tension adjustments.

For any given wet-capstan ramping speed (e.g., between its steady-state speed and its shutdown speed), a set-point tension at the buffering-assist capstan 60 is determined. This target tension is that which yields the target EFL at the given wet-capstan speed. For example, the relationship between wet-capstan speed and target buffer-tube tension may be a continuous, best-fit equation (e.g., buffer-tube tension as a mathematical function of wet-capstan speed) or a step change relationship (e.g., A mpm). Typically, the target tension at a given wet capstan speed is the same during both ramp-up and ramp-down.

Those having ordinary skill in the art will appreciate that some process testing is required to establish the desired relationship between wet-capstan speed and the target buffer-tube tension. In this regard, buffering processes can vary significantly with respect to production parameters, such as buffer tube diameter, buffer-tube material, production line speed, and cooling configuration.

At steady state, the target buffer-tube tension is typically such that the buffering-assist capstan 60 runs faster than the wet capstan 70.

In one embodiment of tension-controlled ramping, however, the set-point buffer-tube tension during ramping (e.g., at startup) is such that the buffering-assist capstan 60 runs the same speed or slower than the wet capstan 70. Here, positive tension (e.g., an elongating tension) is created between the buffering-assist capstan 60 and the wet capstan 70.

In an alternative embodiment of tension-controlled ramping, the set-point buffer-tube tension during ramping (e.g., at startup) is such that the buffering-assist capstan 60 runs faster than the wet capstan 70. Here, negative tension (e.g., compression) is created between the buffering-assist capstan 60 and the wet capstan 70 (and an elongating tension exists between the extruder crosshead 20 and the buffering-assist capstan 60).

In another alternative embodiment of tension-controlled ramping, the buffer-tube tension is directly maintained as a function of buffering-assist-capstan speed rather than wet-capstan speed. In this embodiment, at any buffering-assist-capstan ramping speed (e.g., between the initial startup speed and steady-state speed), a sensor/transmitter 80 measures the buffer-tube tension at or near the buffering-assist capstan 60 and transmits the measurement to a controller 75. The controller 75 compares this actual tension to the programmed set point tension, which is predetermined for any given buffering-assist-capstan ramping speed. If the measured tension deviates from the set-point tension, the controller 75 transmits a signal to the wet capstan 70 to adjust its speed.

It is possible that some buffering operations might be better regulated by varying the speed of a downstream device (e.g., the wet capstan 70) rather than varying the speed of a comparatively upstream device (e.g., the buffering-assist capstan 60).

Although the foregoing description discusses high filling coefficients with respect to loose buffer tubes containing discrete optical fibers (i.e., non-ribbonized optical fibers), the present invention also embraces buffer tubes containing optical-fiber ribbons at high filling coefficients.

In this regard, multiple optical fibers as disclosed herein may be sandwiched, encapsulated, and/or edge bonded to form an optical-fiber ribbon. Optical-fiber ribbons can be divisible into subunits (e.g., a twelve-fiber ribbon that is splittable into six-fiber subunits). Moreover, a plurality of such optical-fiber ribbons may be aggregated to form a ribbon stack, which can have various sizes and shapes.

For example, it is possible to form a rectangular ribbon stack or a ribbon stack in which the uppermost and lowermost optical-fiber ribbons have fewer optical fibers than those toward the center of the stack. This construction may be useful to increase the density of optical elements (e.g., optical fibers) within the present buffer tube.

A rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

It is desirable to increase the density of elements such as optical fibers or optical-fiber ribbons within fiber optic cables. Accordingly, one or more buffer tubes according to the present invention may be positioned within a fiber optic cable.

In this regard, a plurality of the present buffer tubes may be positioned externally adjacent to and stranded around a central strength member. This stranding can be accomplished in one direction, helically, known as "S" or "Z" stranding, or Reverse Oscillated Lay stranding, known as "S-Z" stranding.

Stranding about the central strength member reduces optical fiber strain when cable strain occurs during installation and use. With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers. Those having ordinary skill in the art will understand the benefit of minimizing fiber strain for both tensile cable strain and longitudinal compressive cable strain during installation or operating conditions.

In a stranding variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of the present buffer tubes may be simply placed externally adjacent to the central strength member (i.e., the buffer tubes are not intentionally stranded or arranged around the central strength member in a particular manner and run substantially parallel to the central strength member).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or, within the interior space of a buffer-tube-free cable.

Yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube (Overton et al.), which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Patent Application Publication No. US2008/0145010 A1 for a Gel-Free Buffer Tube with Adhesively Coupled Optical Element (Overton et al.), now U.S. Pat. No. 7,599,589, each of which is hereby incorporated by reference in its entirety.

As will be understood by those having ordinary skill in the art, a cable enclosing buffer tubes as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical-fiber cable sheaths typically have a circular cross section, but cable sheaths alternatively may have an irregular or non-circular shape (e.g., an oval, trapezoidal, or flat cross-section).

In general and as will be known to those having ordinary skill in the art, a strength member is typically in the form of a rod or braided/helically wound wires or fibers, though other configurations will be within the knowledge of those having ordinary skill in the art.

Optical-fiber cables containing buffer tubes as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical-fiber cables may be installed within ducts, microducts, plenums, or risers. By way of example, an optical-fiber cable may be installed in an existing duct or microduct by pulling or blowing (e.g., using compressed air). An exemplary cable installation method is disclosed in commonly assigned U.S. Patent Application Publication No. US2007/0263960 for a Communication Cable Assembly and Installation Method (Lock et al.), now U.S. Pat. No. 7,574,095, and U.S. Patent Application Publication No. US2008/0317410 for a Modified Pre-Ferrulized Communication Cable Assembly and Installation Method (Griffioen et al.), now U.S. Pat. No. 7,665,902, each of which is incorporated by reference in its entirety.

As noted, the present buffer tubes may be stranded (e.g., around a central strength member). In such configurations, an optical-fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical-fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical-fiber cable should be no more than about seventy to eighty percent of the duct's or microduct's inner diameter.

Moreover, the optical-fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. (Figure-eight cables and other designs can be directly buried or installed into ducts, and may optionally include a toning element, such as a metallic wire, so that they can be found with a metal detector.

To effectively employ optical fibers in a transmission system, connections are required at various points in the network. Optical fiber connections are typically made by fusion splicing, mechanical splicing, or mechanical connectors.

The mating ends of connectors can be installed to the fiber ends either in the field (e.g., at the network location) or in a factory prior to installation into the network. The ends of the connectors are mated in the field in order to connect the fibers together or connect the fibers to the passive or active components. For example, certain optical-fiber cable assemblies (e.g., furcation assemblies) can separate and convey individual optical fibers from a multiple optical-fiber cable to connectors in a protective manner.

The deployment of such optical-fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present buffer tubes may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of an optical fiber. By way of example, the optical fiber may be wound with a bending radius of less than about 15 millimeters (e.g., 10 millimeters or less, such as about 5 millimeters) in the optical module or the storage box.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.) U.S. patent application Ser. No. 12/629,495 for an Amplifying Optical Fiber and Production Method, filed Dec. 2, 2009, (Pastouret et al.); U.S. patent application Ser. No. 12/633,229 for an Ionizing Radiation-Resistant Optical Fiber Amplifier, filed Dec. 8, 2009, (Regnier et al.); U.S. patent application Ser. No. 12/636,277 for a Buffered Optical Fiber, filed Dec. 11, 2009, (Testu et al.); U.S. patent application Ser. No. 12/683,775 for a Method of Classifying a Graded-Index Multimode Optical Fiber, filed Jan. 7, 2010, (Gholami et al.); U.S. patent application Ser. No. 12/692,161 for a Single-Mode Optical Fiber, filed Jan. 22, 2010, (Richard et al.); U.S. patent application Ser. No. 12/694,533 for a Single-Mode Optical Fiber Having an Enlarged Effective Area, filed Jan. 27, 2010, (Sillard et al.); U.S. patent application Ser. No. 12/694,559 for a Single-Mode Optical Fiber, filed Jan. 27, 2010, (Sillard et al.); U.S. patent application Ser. No. 12/708,810 for a Optical Fiber Amplifier Having Nanostructures, filed Feb. 19, 2010, (Burow et al.); and U.S. patent application Ser. No. 12/765,182 for a Multimode Fiber, filed Apr. 22, 2010, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); U.S. patent application Ser. No. 12/649,758 for a UVLED Apparatus for Curing Glass-Fiber Coatings, filed Dec. 30, 2009, (Hartsuiker et al.); U.S. patent application Ser. No. 12/700,293 for a Central-Tube Cable with High-Conductivity Conductors Encapsulated with High-Dielectric-Strength Insulation, filed Feb. 4, 2010, (Ryan et al.) and U.S. patent application Ser. No. 12/710,584 for a Cable Having Lubricated, Extractable Elements, filed Feb. 23, 2010, (Tatat et al.).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An optical-fiber buffer tube, comprising:
   a polymeric tube defining an annular space;
   a plurality of optical fibers positioned within the annular space of said polymeric tube, said optical fibers complying with the ITU-T G.652.D recommendations; and
   a thixotropic composition at least partially filling the annular space of said polymeric tube;
   wherein said optical-fiber buffer tube possesses a buffer-tube filling coefficient that is substantially 0.30 or higher;
   wherein, upon subjecting said optical-fiber buffer tube to the mid-span testing according to the USDA Rural Electrification Administration mid-span standard, at a wavelength of 1550 nanometers, (i) each of said optical fibers enclosed within said buffer tube has increased attenuation of no more than 0.1 dB and (ii) said optical fibers enclosed within said buffer tube have a mean increased attenuation of no more than 0.05 dB;
   wherein, upon subjecting said optical-fiber buffer tube to post-extrusion-shrinkage testing in accordance with the TMA method, said buffer tube exhibits post-extrusion shrinkage (PES) of 0.1 percent or less; and
   wherein said buffer tube has permanent deformations of less than 10 percent after sheave testing.

2. The optical-fiber buffer tube according to claim 1, wherein said optical fibers meet the ITU-T G.657.A1 (11/2009) recommendations and/or the ITU-T G.657.B2 (11/2009) recommendations.

3. The optical-fiber buffer tube according to claim 1, said buffer tube possessing a filling coefficient of at least 0.45.

4. The optical-fiber buffer tube according to claim 1, wherein, upon subjecting said optical-fiber buffer tube to one temperature cycle of the mid-span testing according to the modified USDA Rural Electrification Administration mid-span standard, which includes first measuring attenuation after soaking said optical-fiber buffer tube at 70° C. for 14 hours and thereafter measuring attenuation after soaking said optical-fiber buffer tube at −40° C. for three hours, said optical fibers possess an average change in optical-fiber attenuation of 0.15 dB or less at a wavelength of 1550 nanometers.

5. The optical-fiber buffer tube according to claim 4, wherein, upon subjecting said optical-fiber buffer tube to one temperature cycle of the mid-span testing according to the modified USDA Rural Electrification Administration mid-span standard, at a wavelength of 1550 nanometers, (i) each of said optical fibers enclosed within said buffer tube has increased attenuation of no more than 0.1 dB and (ii) said optical fibers enclosed within said buffer tube have a mean increased attenuation of no more than 0.05 dB.

6. The optical-fiber buffer tube according to claim 1, wherein said buffer tube exhibits excess fiber length (EFL) of no more than 0.25 percent.

7. The optical-fiber buffer tube according to claim 1, wherein said optical fibers, at a wavelength of 1550 nanometers, have a microbending sensitivity of more than 4.0 (dB/km)/(gf/mm) when measured by an expandable drum apparatus at a temperature between −30° C. and 60° C.

8. An optical-fiber buffer tube, comprising:
a polymeric tube defining an annular space;
a plurality of optical fibers positioned within the annular space of said polymeric tube, said optical fibers complying with the ITU-T G.657.A1 (11/2009) recommendations and/or the ITU-T G.657.B2 (11/2009) recommendations; and
a thixotropic composition at least partially filling the annular space of said polymeric tube;
wherein said optical-fiber buffer tube possesses a buffer-tube filling coefficient of at least 0.35;
wherein, upon subjecting said optical-fiber buffer tube to the mid-span testing according to the USDA Rural Electrification Administration mid-span standard, at a wavelength of 1550 nanometers, said optical fibers enclosed within said buffer tube have a mean increased attenuation of no more than 0.05 dB;
wherein, upon subjecting said optical-fiber buffer tube to post-extrusion-shrinkage testing in accordance with the TMA method, said buffer tube exhibits post-extrusion shrinkage (PES) of no more than 0.1 percent; and
wherein said buffer tube has permanent deformations of less than 10 percent after sheave testing.

9. The optical-fiber buffer tube according to claim 8, wherein, upon subjecting said optical-fiber buffer tube to the mid-span testing according to the USDA Rural Electrification Administration mid-span standard, each of said optical fibers enclosed within said buffer tube has increased attenuation of no more than 0.1 dB at a wavelength of 1550 nanometers.

10. The optical-fiber buffer tube according to claim 9, wherein said buffer tube exhibits excess fiber length (EFL) of no more than 0.05 percent.

11. The optical-fiber buffer tube according to claim 8, said buffer tube possessing a filling coefficient of at least 0.40.

12. The optical-fiber buffer tube according to claim 11, wherein said buffer tube exhibits excess fiber length (EFL) of no more than 0.25 percent.

13. The optical-fiber buffer tube according to claim 8, said buffer tube possessing a filling coefficient of at least 0.45.

14. The optical-fiber buffer tube according to claim 13, wherein said buffer tube has permanent deformations of less than 5 percent after sheave testing.

15. The optical-fiber buffer tube according to claim 13, wherein said buffer tube exhibits excess fiber length (EFL) of no more than 0.15 percent.

16. The optical-fiber buffer tube according to claim 8, wherein, upon subjecting said optical-fiber buffer tube to one temperature cycle of the mid-span testing according to the modified USDA Rural Electrification Administration mid-span standard, which includes first measuring attenuation after soaking said optical-fiber buffer tube at 70° C. for 14 hours and thereafter measuring attenuation after soaking said optical-fiber buffer tube at −40° C. for three hours, at a wavelength of 1550 nanometers, (i) each of said optical fibers enclosed within said buffer tube has increased attenuation of no more than 0.1 dB and (ii) said optical fibers enclosed within said buffer tube have a mean increased attenuation of no more than 0.05 dB.

17. An optical-fiber buffer tube, comprising:
a polymeric tube defining an annular space;
a plurality of optical fibers positioned within the annular space of said polymeric tube, said optical fibers complying with the ITU-T G.657.A1 (11/2009) recommendations and/or the ITU-T G.657.B2 (11/2009) recommendations; and
a thixotropic composition at least partially filling the annular space of said polymeric tube;
wherein said optical-fiber buffer tube possesses a buffer-tube filling coefficient of at least 0.40;
wherein, upon subjecting said optical-fiber buffer tube to post-extrusion-shrinkage testing in accordance with the TMA method, said buffer tube exhibits post-extrusion shrinkage (PES) of no more than about 0.1 percent; and
wherein, upon subjecting said optical-fiber buffer tube to the mid-span testing according to the USDA Rural Electrification Administration mid-span standard, said optical fibers enclosed within said buffer tube have a mean increased attenuation of no more than 0.05 dB at a wavelength of 1550 nanometers.

18. The optical-fiber buffer tube according to claim 17, wherein, upon subjecting said optical-fiber buffer tube to the mid-span testing according to the USDA Rural Electrification Administration mid-span standard, each of said optical fibers enclosed within said buffer tube has increased attenuation of no more than 0.1 dB at a wavelength of 1550 nanometers.

19. The optical-fiber buffer tube according to claim 18, wherein said buffer tube exhibits excess fiber length (EFL) of no more than 0.15 percent.

20. The optical-fiber buffer tube according to claim 17, wherein, upon subjecting said optical-fiber buffer tube to one temperature cycle of the mid-span testing according to the modified USDA Rural Electrification Administration mid-span standard, which includes first measuring attenuation after soaking said optical-fiber buffer tube at 70° C. for 14 hours and thereafter measuring attenuation after soaking said optical-fiber buffer tube at −40° C. for three hours, at a wavelength of 1550 nanometers, (i) each of said optical fibers enclosed within said buffer tube has increased attenuation of no more than 0.1 dB and (ii) said optical fibers enclosed within said buffer tube have a mean increased attenuation of no more than 0.05 dB.

21. The optical-fiber buffer tube according to claim 17, wherein said buffer tube has permanent deformations of less than 5 percent after sheave testing.

22. The optical-fiber buffer tube according to claim 17, said buffer tube possessing a filling coefficient of at least 0.45.

23. The optical-fiber buffer tube according to claim 22, wherein said buffer tube has permanent deformations of less than 10 percent after sheave testing.

24. The optical-fiber buffer tube according to claim 22, wherein said buffer tube exhibits excess fiber length (EFL) of no more than 0.05 percent.

25. The optical-fiber buffer tube according to claim 22, wherein said polymeric tube comprises nucleated polyethylene, nucleated polypropylene, or a copolymer or a blend thereof.

26. The optical-fiber buffer tube according to claim 17, wherein, upon subjecting said optical-fiber buffer tube to one temperature cycle of the mid-span testing according to the modified USDA Rural Electrification Administration mid-span standard, which includes first measuring attenuation after soaking said optical-fiber buffer tube at 70° C. for 14 hours and thereafter measuring attenuation after soaking said optical-fiber buffer tube at −40° C. for three hours, said optical fibers possess an average change in optical-fiber attenuation of 0.15 dB or less at a wavelength of 1550 nanometers.

* * * * *